July 6, 1954

C. A. WILEY 2,683,247

SPACE REFERENCE DEVICE

Filed Aug. 8, 1952

INVENTOR.
Carl A. Wiley

BY
AH Dedham
ATTORNEY

July 6, 1954
C. A. WILEY
2,683,247
SPACE REFERENCE DEVICE
Filed Aug. 8, 1952
3 Sheets-Sheet 2
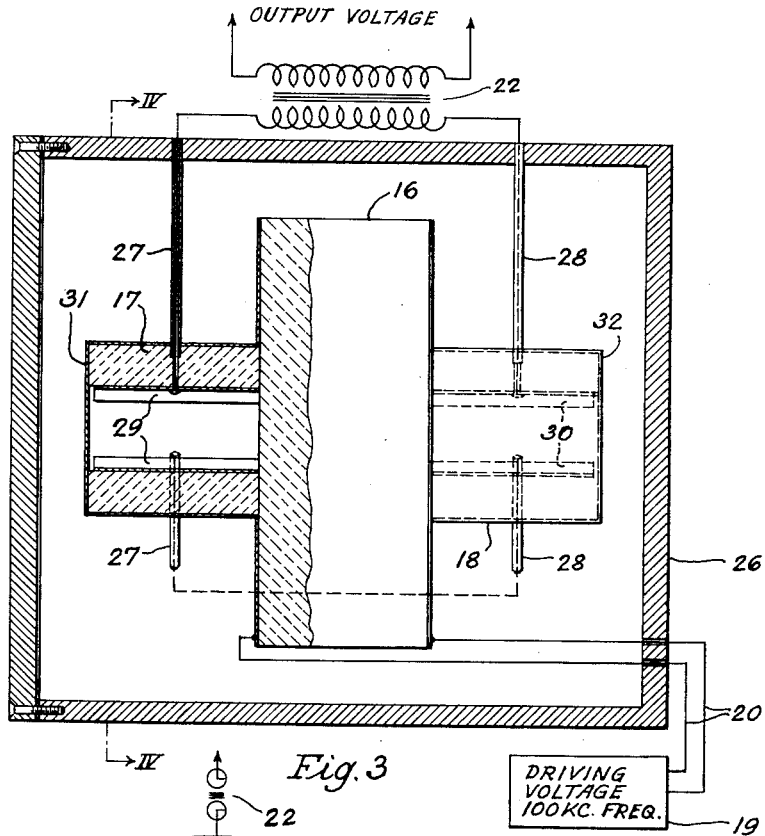
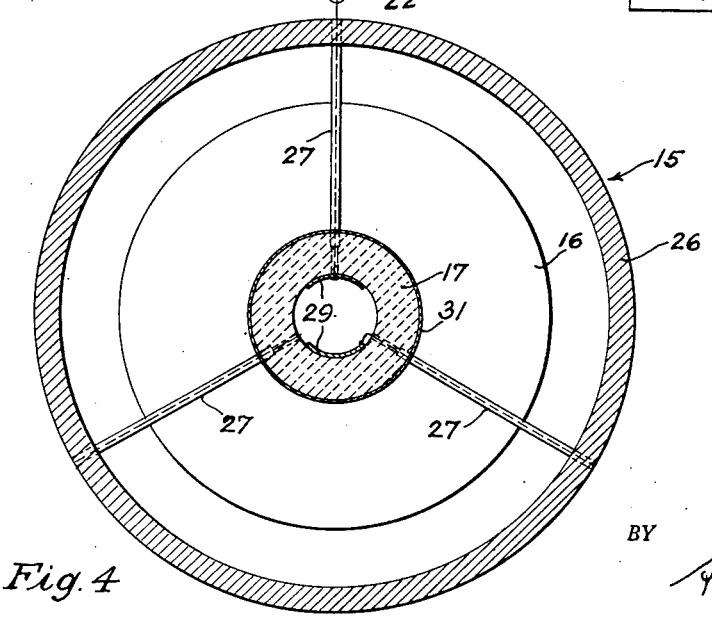
INVENTOR.
Carl A. Wiley
BY
*H H Oldham*
ATTORNEY July 6, 1954  C. A. WILEY  2,683,247
SPACE REFERENCE DEVICE
Filed Aug. 8, 1952  3 Sheets-Sheet 3
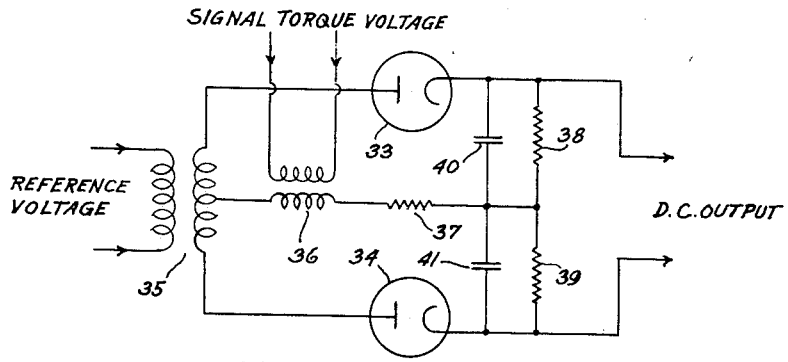
Fig. 5 - PHASE DISCRIMINATOR
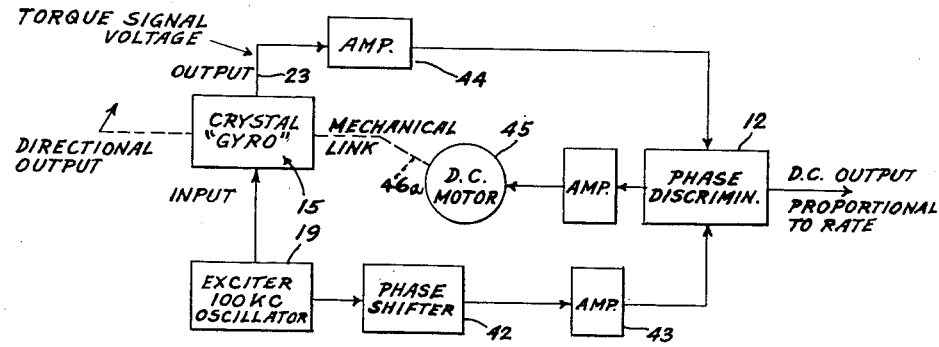
Fig. 6 - CRYSTAL "GYRO" UTILIZATION
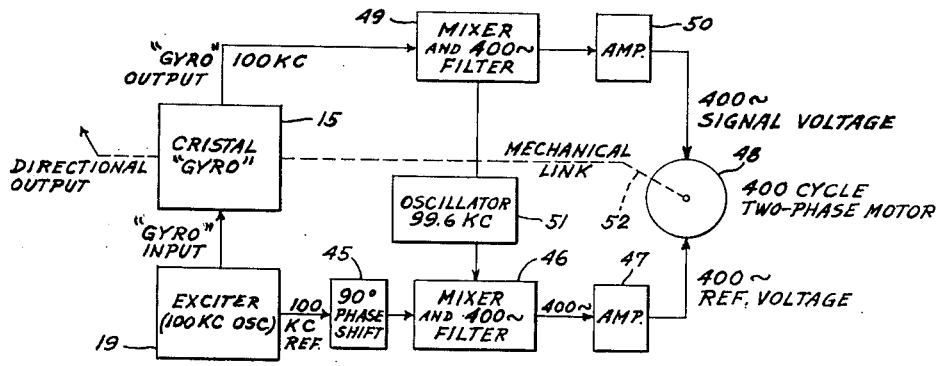
Fig. 7 - CRYSTAL "GYRO" UTILIZATION
INVENTOR.
Carl A. Wiley
BY
ATTORNEY Patented July 6, 1954

2,683,247

UNITED STATES PATENT OFFICE 2,683,247

SPACE REFERENCE DEVICE

Carl A. Wiley, Phoenix, Ariz., assignor to Goodyear Aircraft Corporation, Akron, Ohio, a corporation of Delaware Application August 8, 1952, Serial No. 303,447

11 Claims. (Cl. 318—489)

This invention relates to apparatus for measuring angular movement, and, more particularly, to an inertia member mounted in relation to an axis by torque sensitive means, with means for rapidly changing the radius of gyration of the inertia member with respect to the axis, and means associated with the torque sensitive means for indicating angular movement of the apparatus.

Prior to the present invention apparatus for measuring angular velocity or movement has been relatively heavy, space consuming, and expensive, a typical apparatus in this field being a gyroscope of mechanical-electrical type. Moreover, known apparatus is not only subject to the objections noted, but often includes errors of progression.

It is the general object of this invention to avoid and overcome objections to and difficulties of known apparatus for measuring angular movement by the provision of apparatus characterized by light weight, relatively small space requirements, inexpensiveness and simplicity coupled with high efficiency and accuracy.

Another object of the invention is the provision of apparatus of the character described utilizing the principle of rapidly changing the radius of gyration at a known frequency of an inertia member, measuring the change in torque characteristics of the member resulting from any angular movement of the apparatus, and correlating the change in torque with the radius of gyration changes to give an indication of angular movement of the apparatus.

Another object of the invention is to provide piezo-electric means in apparatus such as described.

Another object of my invention is to provide high frequency apparatus of the type described.

Another object of the invention is the provision of control mechanism for automatically re-positioning high frequency apparatus for sensing angular movement so that it will function in a space reference capacity.

Another object of the invention is to provide discriminating means for correlating high torque signals with a high frequency reference signal from the means for changing the radius of gyration of the inertia member so as to provide an indication of angular movement of the apparatus.

The foregoing objects of the invention, and other objects which will become apparent as the description proceeds, are achieved by apparatus for measuring angular velocity about an axis and comprising an inertia member, torque sensitive means mounting the inertia member for resilient vibrating movement about the axis, means for changing at high frequency the radius of gyration of the inertia member with respect to the axis, and means associated with the torque sensitive means for indicating angular movement.

For a better understanding of the invention reference should be had to the accompanying drawings wherein Figure 1 is a schematic illustration of one apparatus employing the principles of the invention.

Figure 3 is an enlarged longitudinal vertical sectional view of the inertia member and the torque sensitive members of the apparatus in Figure 2;

Figure 4 is a transverse vertical sectional view taken substantially on line IV—IV of Figure 3;

Figure 5 is a schematic wiring diagram of the phase discriminator of Figure 1; and Figures 6 and 7 are diagrammatic showings of control mechanisms for adapting the apparatus to function in space reference capacity, or the like.

Figure 1:
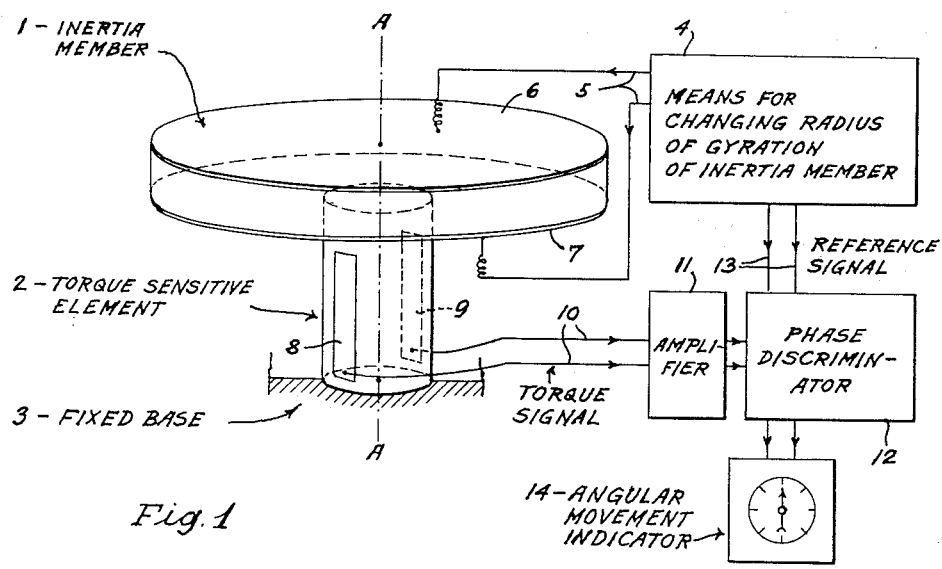

Having particular reference to Figure 1 of the drawings, the numeral 1 indicates an inertia member which may take any of a variety of shapes or forms, but which conveniently is made in the shape of a disc and from piezo-electric material, such as barium titanate. The inertia member 1 is mounted axially of an axis A—A by means of a torque sensitive element 2 which, likewise, may take a variety of shapes and which can be made from a variety of materials. In the embodiment of the invention illustrated the torque sensitive element 2 is in the shape of a shaft of considerably less diameter than the inertia member 1, with the axis of the shaft coinciding with the axis A—A. The torque sensitive element 2 is fixed at one end to the inertia member 1, and another portion of the shaft, such as its opposite end, is fixed against rotation, for example, on a base 3. In one form of the invention the torque sensitive element 2 is made from a piezo-electric material such as an ammonium dihydrogen phosphate crystal.

Some driver means are provided for rapidly changing at high frequency the radius of gyration and the moment of inertia of the inertia member 1 with respect to the axis A—A, and dependent upon the shape and the material of the inertia member 1 these means, indicated by the numeral 4, can be piezo-electric, or the like. When the inertia member 1 is made from a piezo-electric crystal, such as barium titanate, the means 4 normally comprises a high frequency voltage source connected by electric leads 5 in driving relation to the inertia member by means of electro-conductive coatings 6 and 7 on opposite sides of the inertia member.

Electrode means, such as a pair of diametrically-opposed coatings or plates 8 and 9 are associated with the torque sensitive element 2 and are connected by electric leads 10 with an amplifier 11, the output of the amplifier passing to a phase discriminator 12. The discriminator likewise receives a reference signal by electric leads 13 from the driver means 4, and the output of the phase discriminator 12 is connected to an angular movement indicator 14.

In the operation of the apparatus as described, it is evident that if there is any angular movement of the inertia member 1 about the axis A—A, then the cyclic and high frequency change of the radius of gyration of the inertia member and the attendant cyclic change in the moment of inertia of the member produces a cyclic torque about the axis A—A. The frequency of this torque is the frequency of the change in the radius of gyration, and the magnitude of the torque is proportional to the angular rate of rotation of the inertia member (usually caused by the turning of the entire apparatus) about the axis A—A. The inertia member 1 is caused to vibrate in rotation about the axis A—A inasmuch as the member 1 is relatively free to vibrate in this manner, the torque sensitive element 2 allowing it. This vibration is superimposed on the angular rotation about the axis A—A, this angular rotation having much lower frequency components whose measurement is desired. Of course, the vibration of the inertia member 1 exerts a turning moment or cycling changes in turning moment on the torque sensitive element 2, and this generates a torque signal from the electrodes 8 and 9 to the amplifier 11 which passes the amplified torque signal to the phase discriminator 12 which serves to synchronously demodulate the torque signal having reference to the cyclic reference signals passed to the discriminator 12 from the means 4. The output of the phase discriminator 12 is indicated in the angular movement indicator 14, which as hereinafter described, can be used to indicate rate of angular movement, and by integration extent of angular movement, or which can be used to correct or compensate for angular movement to hold the apparatus against angular movement around axis A—A so that the apparatus becomes a space reference mechanism, like an attitude gyroscope. The device is designated in the drawings as a "gyro" in this sense.

Figure 2:
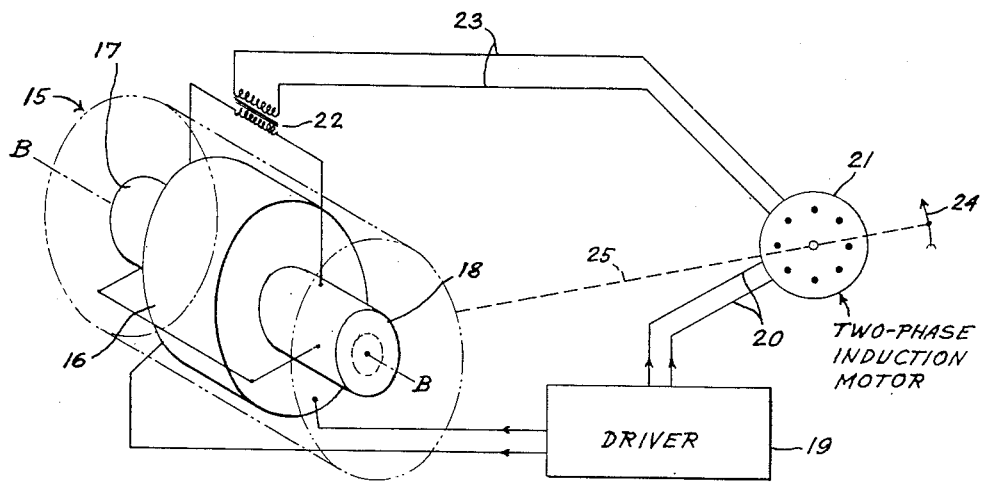
Figure 2 is a schematic diagram of a modified form of apparatus incorporating the principles of the invention.

The embodiment of the invention illustrated in Figures 2, 3 and 4 includes the sensing element indicated as a whole by the numeral 15, and comprising an inertia member 16 and torque sensitive elements 17 and 18 mounting the inertia member 16. The radius of gyration and the moment of inertia of the inertia member 16 are cyclically varied by a driver 19 having electric leads 20 extending to a phase discriminator 21 in the form of a two phase induction motor, the leads 20 being connected to one of the two phases. The torque sensitive elements 17 and 18 are connected in electrical series with each other and to the primary of a transformer 22, the secondary of which is connected by electric lead 23 to the second phase of the two phase induction motor 21. Amplification of the transformer output before passing to the motor 21 is usually advisable. When the inertia member 16 is a piezo-crystal the driver 19 takes the form of a relatively high frequency oscillator, such as a 100 kilocycle oscillator. The output shaft of the induction motor 21 may be connected to a pointer 24 which can be spring biased to indicate rate of angular movement, or the output shaft of the induction motor can be coupled, as indicated by the dotted line 25, to the casing of the sensing mechanism 15 so as to move the casing about the axis B—B to correct for or compensate for any angular movement thereof.

Figures 3 and 4 illustrate in greater detail the sensing mechanism 15, this mechanism including a cylindrical casing 26 which may be made airtight and from which the air may be evacuated if desired. As previously indicated, the inertia member 16 may be made from various materials capable of performing as herein described and may take a variety of forms, but it is conveniently made of a piezo-electrical crystal, for example, barium titanate, and in the form of a disc or cylinder. In one embodiment of the invention the barium titanate crystal was made one centimeter thick in an axial direction and 2.56 centimeters in diameter. When using the barium titanate disc as the inertia member the driver 19 for rapidly changing the radius of gyration of the inertia member takes the form of a driving voltage created at a 100 kilocycle frequency and electrically connected to the inertia member 16.

Supporting the inertia member 16 from opposite sides are torque sensitive elements 17 and 18 which may be made in the form of hollow shafts as shown and from a piezo-electric crystal, such as ammonium dihydrogen phosphate. In the structure shown it is advisable to make the two torque sensitive elements 17 and 18 as two sections of the same ammonium dihydrogen phosphate cylinder in order to make the balance between these two elements as exact as possible. In the embodiment of the invention illustrated each torque sensitive element is .965 centimeter long, is one centimeter in diameter and is provided with a one-half centimeter axial hole. The torque sensitive elements 17 and 18 are adhesively secured to the inertia member 16 in alignment with the axis B—B thereof, and each torque sensitive element is supported from the casing 26 approximately half way of each element's length by three hollow rods spaced apart 120 degrees, the rods being indicated by the numeral 27 for torque sensitive element 17 and by the numeral 28 for torque sensitive element 18. Each torque sensitive element is provided with a pair of opposed electrodes 29 and 30, respectively, and these are connected by wires running through the tubes 27 and 28 to the primary of transformer 22 with one contact 29 and one contact 30 being connected to each other so that the elements are in series with the transformer.

By mounting the torque sensitive elements 17 and 18 at their torsional nodes in the manner described, the voltages set up from torsional oscillation are 180 degrees out of phase so that these torsional voltages alone are effective in energizing the transformer 22. Each of the crystals of the torque sensitive elements 17 and 18 is capped and surrounded by a metal foil shield 31 and 32, respectively, which are grounded so that the output electrodes 29 and 30 are completely shielded from the driving electrodes to the inertia member 16.

It will be understood that the output signal from the transformer 22 may be amplified and compared with the driving signal from driver 19 in a phase discriminator to obtain a D. C. signal proportional to rate of angular movement. However, since the output or torque signal is naturally in quadrature with the driving voltage the use of the two phase induction motor 21 is possible. The amplified output from the torque sensitive elements 17 and 18 can be applied directly to one phase of the two phase induction motor 21, the other phase of which is energized by the driver 19. It is evident that as the inertia member 16 reverses its direction of rotation due to a change in its radius of gyration that the torque signal goes from leading to lagging the driving signal by 90 degrees and the motor 21 reverses its direction of rotation. The motor torque is proportional to the signal from the torque element and hence to the rate of rotation of the inertia member. The induction motor 21 must have its magnetic portions made of a metal oxide magnetic material, such as "Ferroxcube," having a permeability of over a thousand which has losses at the one hundred kilocycle operating frequency comparable to the losses in silicon steel at 60 cycles.

It will be understood that in the operation of the several embodiments of the invention described that the high frequency change in the radius of gyration and the moment of inertia of inertia member 1 of Figure 1 and the inertia member 16 of Figure 2 results in no output in the torque sensitive elements supporting the inertia members as long as there is no rotation of the complete apparatus of Figure 1 about axis A—A or no rotation of the complete apparatus of Figure 2 about axis B—B. It is only when the apparatus of Figure 1 turns about axis A—A or the apparatus of Figure 2 turns around axis B—B concurrently with the rapid change in the radius of gyration of the inertia member that the torque sensitive elements are energized to give an indication of angular movement, a measure of angular rate, or are used to compensate for any movement and to reposition the apparatus so that the torque sensitive element output remains zero to rotationally stabilize the apparatus in space.

The apparatus of the invention has been described solely in conjunction with a single axis, but it is readily evident that several of the apparatus of the invention can be combined to perform like functions in conjunction with two or more axes simultaneously, and that one particular application of the apparatus of the invention is to provide an attitude indicating device similar to an attitude gyroscope.

In Figure 5 of the application is illustrated one typical phase discriminating circuit comprising a pair of diodes 33 and 34, couplings or transformers 35 and 36, resistances 37, 38 and 39, and condensers 40 and 41 connected in the manner illustrated. The purpose and function of the phase discriminator is as heretofore described.

Figure 6 more specifically illustrates a crystal angular rate measuring device utilization in which a crystal unit, such as 15, is driven or excited at high frequency by driver 19 which also supplies a reference voltage through a phase shifter 42 and amplifier 43 to a phase discriminator 12. The output leads 23 of the crystal unit 15 supply a torque signal voltage through an amplifier 44 to the phase discriminator 12. The output of the phase discriminator is a D. C. voltage proportioned to the rate of angular movement and this is connected to a D. C. motor 45 which in turn is connected by mechanical linkage 46 to reposition the crystal "gyro" to its original position.

Figure 7 illustrates another crystal angular rate measuring device utilization in which the crystal "gyro" is again driven by a 100 kc. exciter 19 which passes a reference signal to a 90 degree phase shifter 45, through a mixer and 400 cycle filter 46, and an amplifier 47 to supply a 400 cycle reference voltage to a 400 cycle two phase motor 48. The torque signal voltage output of the crystal passes to a mixer and 400 cycle filter 49 and through an amplifier 50 to supply a 400 cycle signal voltage to the second phase of motor 48. A 99.6 kc. oscillator 51 is provided to beat with the 100 kc. inputs of mixers 46 and 49 to provide the 400 cycle outputs of the reference and torque signal to the motor 48. Mechanical linkage 52 repositions the crystal 15 to provide the equivalent of an attitude gyroscope.

From the foregoing it will be recognized that the various objects of the invention have been achieved by the provision of relatively inexpensive, light weight, small space consuming and yet highly efficient apparatus for measuring, indicating or compensating for angular movement. The principles of the invention have been particularly described in conjunction with piezoelectric crystals which comprise the preferred embodiments of the invention, but other electrical members or mechanisms capable of performing with substantially the high frequency characteristics described can be employed.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for measuring angular velocity about an axis and comprising a piezo-electric crystal forming an inertia member, torque sensitive means of the piezo-electric type mounting the inertia member for resilient vibrating movement about the axis, high frequency means for rapidly changing the radius of gyration of the inertia member with respect to the axis, a phase discriminator, means supplying a reference signal to the discriminator from the means for changing the radius of gyration of the inertia member, means connecting a torque signal from the torque sensitive means to the discriminator, means for shifting the phase of one of the signals, and angular movement indicating means connected to the output of the discriminator.

2. Apparatus for measuring angular velocity about an axis and comprising a piezo-electric crystal forming an inertia member, torque sensitive means of the piezo-electric type mounting the inertia member for resilient vibrating movement about the axis, high frequency means for rapidly changing the radius of gyration of the inertia member with respect to the axis, a two phase induction motor, a transformer, the torque sensitive means producing electric signals out of phase with eaech other and connected to the transformer, the output of the transformer connected to one phase of the induction motor, the other phase of the induction motor being connected to a reference signal from the means changing the radius of gyration of the inertia member, and angular movement indicating means driven by the motor.

3. Apparatus for measuring angular velocity about an axis and comprising a piezo-electric crystal forming an inertia member, a high frequency oscillator connected to the crystal for rapidly changing the radius of gyration thereof, piezo-electric crystal means mounting the crystal of the inertia member so that the crystal means are stressed mechanically by the change in the radius of gyration if there is any rotation about the axis by the apparatus, electric leads to the crystal means, and means connected to the electric leads and the oscillator and responsive to angular movement of the apparatus about the axis.

4. Apparatus for measuring angular velocity about an axis and comprising a piezo-electric crystal associated with an inertia member, a high frequency oscillator connected to the crystal for rapidly changing the radius of gyration thereof, piezo-electric crystal means mounting the crystal of the inertia member so that the crystal means are stressed mechanically by the change in the radius of gyration if there is any rotation about the axis by the apparatus, electric leads to the crystal means, and phase discriminator means connected to the electric leads and the oscillator and responsive to angular movement of the apparatus about the axis.

5. Apparatus for measuring angular velocity about an axis and comprising a barium titanate crystal forming an inertia member, a high frequency oscillator connected to the crystal for rapidly changing the radius of gyration thereof, ammonium dihydrogen phosphate crystal means mounting the crystal of the inertia member so that the crystal means are stressed mechanically by the change in the radius of gyration if there is any rotation about the axis by the apparatus, electric leads to the crystal means, and means connected to the electric leads and the oscillator and responsive to angular movement of the apparatus about the axis.

6. Apparatus for measuring angular velocity about an axis and comprising a barium titanate crystal forming a disc shaped inertia member, a high frequency oscillator connected to the crystal for rapidly changing the radius of gyration thereof, ammonium dihydrogen phosphate crystal means in the form of a shaft mounting the crystal of the inertia member one end of the shaft being fixed axially to the center of the disc forming the inertia member, and another portion of the shaft remote from the disc being fixed against rotation so that the crystal means are stressed mechanically by the change in the radius of gyration if there is any rotation about the axis by the apparatus, electric leads to the crystal means, and means connected to the electric leads and the oscillator and responsive to angular movement of the apparatus about the axis.

7. Apparatus for measuring angular velocity about an axis and comprising a piezo-electric crystal forming a disc shaped inertia member, a high frequency oscillator connected to the crystal for rapidly changing the radius of gyration thereof, piezo-electric crystal means in the form of a shaft mounting the crystal of the inertia member one end of the shaft being fixed axially to the center of the disc forming the inertia member, and another portion of the shaft remote from the disc being fixed against rotation so that the crystal means are stressed mechanically by the change in the radius of gyration if there is any rotation about the axis by the apparatus, electric leads to the crystal means, and means connected to the electric leads and the oscillator and responsive to angular movement of the apparatus about the axis.

8. Space reference apparatus comprising a piezo-electric crystal forming a disc shaped inertia member, a high frequency oscillator connected to the crystal for rapidly changing the radius of gyration thereof, piezo-electrical crystal means in the form of a shaft mounting the crystal of the inertia member one end of the shaft being fixed axially to the center of the disc forming the inertia member, and another portion of the shaft remote from the disc being fixed against rotation so that the crystal means are stressed mechanically by the change in the radius of gyration if there is any rotation about the axis by the apparatus, electric leads to the crystal means, and a two phase induction motor having one phase connected to the electric leads and the second phase connected to the oscillator and responsive to angular movement of the apparatus about the axis.

9. Space reference apparatus comprising a piezo-electric crystal forming an inertia member, torque sensitive means of the piezo-electric type mounting the inertia member for resilient vibrating movement about an axis, high frequency means for changing the radius of gyration of the inertia member with respect to the axis, a high frequency oscillator having a frequency just slightly under the frequency of the high frequency means, mixer and filter means for beating the frequencies of the oscillator and the high frequency means against each other and having an output of a few hundred cycles, a second mixer and filter means for beating the frequencies of the oscillator and the output of the torque sensitive means against each other and having an output of a few hundred cycles, a two phase direct current motor having one phase connected to the first mixer and filter means and a second phase connected to the second mixer and filter means, and mechanical linkage connecting the motor to the inertia member and torque sensitive means to angularly reposition them.

10. Apparatus for measuring angular velocity about an axis and comprising a piezo-electric crystal forming an inertia member, torque sensitive means of the piezo-electric type mounting the inertia member for resilient vibrating movement about the axis, high frequency means for rapidly changing the radius of gyration of the inertia member with respect to the axis, a phase discriminator, means supplying a reference signal to the discriminator from the means for changing the radius of gyration of the inertia member, means connecting a torque signal from the torque sensitive means to the discriminator, a direct current motor driven by the output of the discriminator, and mechanical linkage connecting the motor and the inertia member and torque sensitive means to reposition the member and means to their original angular position.

11. Apparatus for measuring angular velocity about an axis and comprising a piezo-electric crystal forming an inertia member, torque sensitive means of the piezo-electric type mounting the inertia member for resilient vibrating movement about the axis, high frequency means for rapidly changing the radius of gyration of the inertia member with respect to the axis, a phase discriminator, means supplying a reference signal to the discriminator from the means for changing the radius of gyration of the inertia member, means connecting a torque signal from the torque sensitive means to the discriminator, and angular movement indicating means connected to the output of the discriminator.

References Cited in the file of this patent

UNITED STATES PATENTS

| Number | Name | Date |
|---|---|---|
| 2,513,340 | Lyman | July 4, 1950 |
| 2,532,781 | Peterson | Dec. 5, 1950 |
| 2,546,158 | Johnson | Mar. 27, 1951 |
| 2,616,681 | Morrow | Nov. 4, 1952 |
| 2,627,400 | Lyman | Feb. 3, 1953 |